United States Patent
Carroll

(10) Patent No.: US 9,081,102 B2
(45) Date of Patent: Jul. 14, 2015

(54) APPARATUS FOR EXTENDING A SCINTILLATION DETECTOR'S DYNAMIC RANGE

(76) Inventor: Lewis Ronald Carroll, Berkeley, CA (US)

(*) Notice: Subject to any disclaimer, the term of this patent is extended or adjusted under 35 U.S.C. 154(b) by 1082 days.

(21) Appl. No.: 13/048,266

(22) Filed: Mar. 15, 2011

(65) Prior Publication Data

US 2011/0284753 A1    Nov. 24, 2011

Related U.S. Application Data

(60) Provisional application No. 61/396,099, filed on May 21, 2010.

(51) Int. Cl.
*G01T 1/20* (2006.01)
*G01T 1/17* (2006.01)

(52) U.S. Cl.
CPC .......................................... *G01T 1/17* (2013.01)

(58) Field of Classification Search
CPC ............ G01T 1/20; G01T 1/24; G01T 1/2018
USPC ..................... 250/369, 370.01, 336.1, 370.09, 250/370.11; 378/91
See application file for complete search history.

(56) References Cited

U.S. PATENT DOCUMENTS

| | | | |
|---|---|---|---|
| 3,883,756 A * | 5/1975 | Dragon | 327/176 |
| 4,034,222 A * | 7/1977 | Azam et al. | 378/97 |
| 4,198,986 A * | 4/1980 | Suzuki | 600/436 |
| 4,237,424 A | 12/1980 | Weiner | |
| 4,470,017 A | 9/1984 | Eder | |
| 4,535,233 A * | 8/1985 | Abraham | 250/214 A |
| 4,633,881 A * | 1/1987 | Moore et al. | 600/436 |
| 5,546,048 A * | 8/1996 | Sano et al. | 330/263 |
| 5,811,809 A * | 9/1998 | Smith et al. | 250/336.1 |
| 5,990,745 A | 11/1999 | Carroll | |
| 6,054,705 A | 4/2000 | Carroll | |
| 6,292,052 B1 * | 9/2001 | Carlson | 330/9 |
| 6,509,565 B2 * | 1/2003 | Nygard et al. | 250/336.1 |
| 6,781,426 B2 * | 8/2004 | Souchkov | 327/154 |
| 6,858,847 B1 * | 2/2005 | Macciocchi | 250/363.03 |
| 6,977,380 B2 * | 12/2005 | Chowdhury et al. | 250/370.11 |
| 7,271,395 B2 * | 9/2007 | DeGeronimo | 250/382 |
| 7,615,753 B2 * | 11/2009 | Audebert et al. | 250/370.07 |
| 8,237,128 B2 * | 8/2012 | Steadman et al. | 250/370.09 |
| 8,350,221 B2 * | 1/2013 | Steadman et al. | 250/363.04 |
| 2002/0113211 A1 * | 8/2002 | Nygard et al. | 250/336.1 |
| 2002/0181662 A1 * | 12/2002 | Pfleger | 378/207 |
| 2003/0105397 A1 * | 6/2003 | Tumer et al. | 600/436 |
| 2004/0206909 A1 * | 10/2004 | Izumi et al. | 250/395 |

(Continued)

OTHER PUBLICATIONS

Pengg, Pixel Detector Readout Electronics with Two-Level Discriminator Scheme, 1998 IEEE vol. 98 p. 184-188.*

(Continued)

*Primary Examiner* — David Porta
*Assistant Examiner* — Djura Malevic

(57) ABSTRACT

A semiconductor diode scintillation detector probe, in conjunction with a base-line-stabilized, wide-bandwidth first amplifying circuit DC-coupled to a constrained-bandwidth second amplifying circuit DC-coupled, in turn, to a novel analog threshold discriminator circuit, suppresses base-line fluctuation and noise at low input count-rates, while providing a linear rate-meter response for time-random input pulse rates far in excess of what would otherwise—as in the prior art—be 100% saturation.

8 Claims, 7 Drawing Sheets

(56) References Cited

U.S. PATENT DOCUMENTS

| | | | |
|---|---|---|---|
| 2005/0275455 A1 | 12/2005 | DeGeronimo | |
| 2006/0126776 A1* | 6/2006 | Izumi et al. | 376/255 |
| 2009/0302232 A1 | 12/2009 | Grosholz et al. | |
| 2010/0078569 A1* | 4/2010 | Jarron et al. | 250/363.04 |
| 2010/0329425 A1* | 12/2010 | Guo et al. | 378/91 |
| 2011/0248765 A1* | 10/2011 | Tumer et al. | 327/306 |
| 2012/0305786 A1* | 12/2012 | Dierickx | 250/371 |

OTHER PUBLICATIONS

Knoll, Chapter 16 in Radiation Detection and Measurement; ISBN 0-471-49545-X, John Wiley and Sons, New York, 1979.

Corsi, et al, "A Novel Output Baseline Holder Circuit for CMOS Front End Analog Channels", 2008 IEEE Nuclear Science Symposium Conference Record, N11-1.

White, "The Generation of Randon-Time Pulses at an Accurately Known Mean Rate and Having a Nearly Perfect Poisson Distribution" J. Sci Instr., 1964, vol. 41.

Leo, Chapter 14.6 in Techniques for Nuclear and Particle Physics Experiments: A How-To-Approach; Springer Verlag, ISBN 0-387-57280. New York, Heidelberg, 1994.

East, Baseline Stabilization in Direct-Coupled Counting Systems:, Review of Scientific Instruments, vol. 1 pp. 1245-1246, 1970.

Fiorini, et al, "A Baseline Holder for CMOS Readout Circuits with Feedback Extension to the Charge Preamplifier", 2005 IEEE Nuclear Science Conference Record, N14-41.

DeGeronimo, et al, "CMOS Baseline Holder (BLH) for Readout ASICs" IEEE Trans Nucl Sci, vol. 47, No. 3, Jun. 2000.

Elad, et al, "A Transistorized Linear Gate" Nucl Instr and Methods 37, (1965) 58-60.

National Semiconductor, Inc., Data Sheet for LM359 Dual, High-Speed, Programmable, Current-mode (Norton) Amplifiers, Aug. 2000.

* cited by examiner

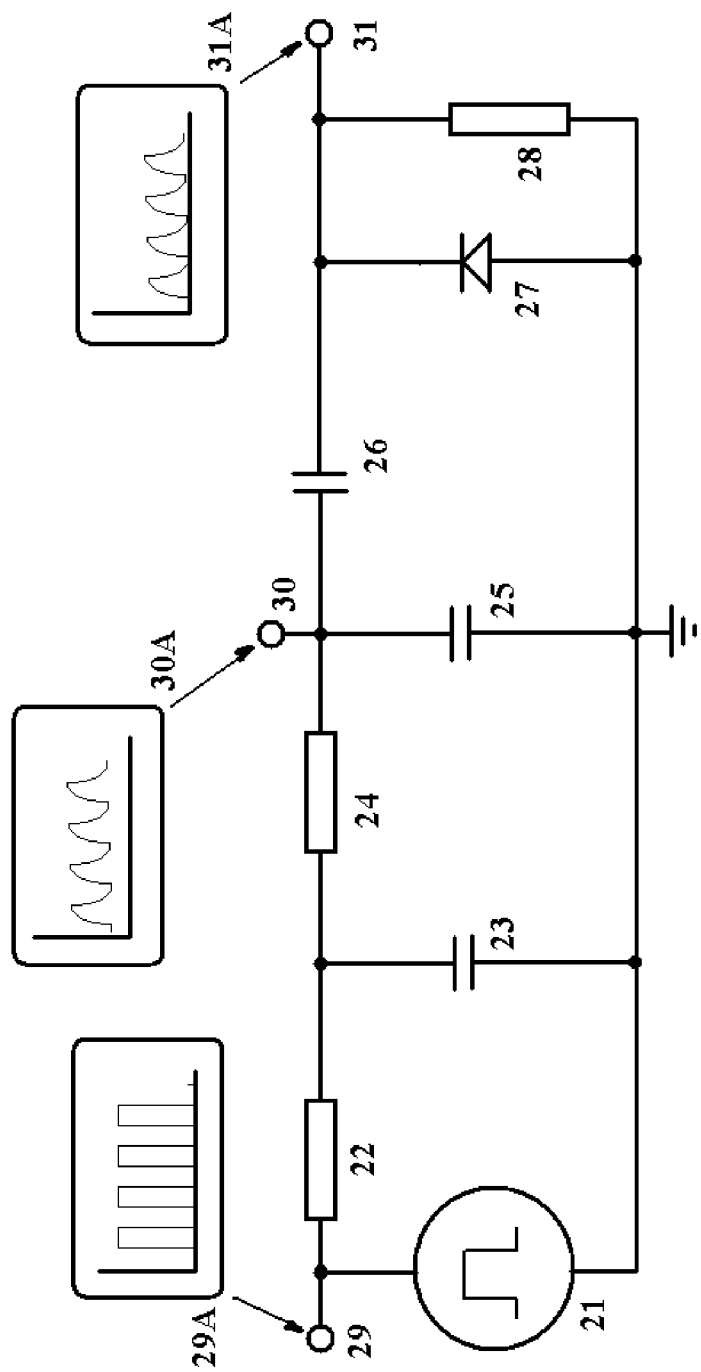
Fig. 5 (illustrative example)

APPARATUS FOR EXTENDING A SCINTILLATION DETECTOR'S DYNAMIC RANGE

CROSS-REFERENCE TO RELATED APPLICATIONS

This application claims the benefit of provisional application 61/396,099 filed May 21, 2010 by the above-named inventor.

FIELD OF THE INVENTION

This invention relates to the field of radiation detection and measurement.

BACKGROUND

Prior Art

A semiconductor device such as a Si PIN photo-diode can serve as a radiation detector by converting energy absorbed in its active volume directly into electronic charge, albeit with relatively low detection sensitivity due to its thin active region and low atomic number (i.e., low 'stopping power').

A more sensitive type of radiation detector employs a scintillating crystal optically coupled to an electro-optical transducer such as a Si PIN photo-diode (or similar semiconductor device) or a photo-multiplier tube. In many applications, the Si PIN photo-diode may be preferred due to its compact size, immunity to ambient magnetic fields, and relatively low cost.

The combination of crystal plus photo-diode converts flashes of light generated in the crystal from the impacts of individual x-ray or gamma-ray photons into pulses of electronic charge proportional to the intensity of the corresponding flashes of light.

The Si PIN photo-diode, or its equivalent, is connected, in turn, to a charge-integrating pre-amplifier. The signal output from the first amplifying stage of the charge-integrating pre-amplifier is a stream of voltage pulses whose amplitude, v (expressed in volts), is given by v=q/c, where q is the amount of charge in a given pulse from the photo-diode (expressed in coulombs), and c is the value of the integrating capacitance of the charge-integrating pre-amplifier (expressed in farads).

The photo-induced charge pulses generated in the photo-diode are generally very weak—on the order of a few femto-coulombs ($10^{-15}$ coulombs). The integrating capacitor in the charge-integrating pre-amplifier is deliberately small—on the order of a pico-farad ($10^{-12}$ farad)—so that the corresponding voltage pulses are of the order of a few millivolts in amplitude. These voltage signal pulses are converted to current signal pulses, whose amplitudes are on the order of a few micro-amperes, by the action of a transconductance amplifier stage, as described in our prior patents (Carroll, 1999, 2000), details of which are incorporated herein by reference.

A radiation detector system of the prior art is shown in its most basic form in the block diagram of FIG. 4. The scintillating crystal, Si PIN photo-diode, and charge-integrating pre-amplifier are sealed in a compact metallic probe-housing to shield against ambient light and electro-magnetic interference. Probe 12 and subsequent circuitry operate in AC-coupled, pulse-counting mode, essentially eliminating base-line fluctuation and drift due to variations in ambient temperature. Thus, when used in applications such as high-performance liquid chromatography (HPLC), or gas chromatography (GC), the ability to discern and evaluate the smallest radio-chromatography peaks—the minimum detectable signal—is ultimately governed by fluctuations in the mean of the low-pass-filtered (or time-averaged) random pulse-train stemming from the detector's response to ambient radiation background in the lab which, in turn, requires that the detector probe be well shielded by lead, or equivalent high-density material so that it 'sees' only the radiation emanating from a loop of flow-tubing placed in tight proximity to the probe.

While this scheme is optimum for detection at low-to-moderate levels of radioactivity encountered in a typical radio-pharmacy lab quality-assurance assay, pulse-counting detectors can suffer from saturation effects due to counting system dead-time when exposed to high levels of radioactivity.

Operational Parameters In this particular embodiment, the pre-amplifier's signal-output current pulses are superimposed on a resting quiescent operating current on the order of ~1 mA. For a constant ambient temperature the resting quiescent operating current remains relatively constant over a wide range of radiation intensities. In this embodiment, the pre-amplifier signal-output current pulses are transmitted to the following post-amplifier stage over the same wire connection (coaxial cable) that carries operating current for the pre-amplifier.

The pre-amplifier's output current signal pulses are unipolar with a fast rise and a somewhat slower return to base-line, with very little undershoot. Those schooled in the art will recognize the fortuitous application of pulse shaping and pole-zero cancellation within the pre-amplifier itself to achieve the preferred signal pulse-shape (Knoll, 1979).

Noise Performance of a semiconductor radiation detector operating at room temperature is inevitably impaired by an inherent noise floor below which signal pulses from low-energy photon interactions in the detector probe are indistinguishable from the noise. To minimize this noise, the first stage 13 of the post-amplifier is followed by a multi-pole pulse-shaping amplifier 14 whose band-width is constrained in order to enhance signal-to-noise ratio. The constrained-bandwidth amplifier produces a nearly Gaussian shaped signal pulse whose width at the base is approximately 25 microseconds—in this embodiment a necessary but reasonable compromise between opposing needs for low dead time and low noise floor. The constrained-bandwidth amplifier is followed, in turn, by a threshold discriminator which drives a time-averaging low-pass filter, resulting in a rate-meter voltage signal at output-terminal 65, that is proportional to the time-averaged, or mean, rate of photon-induced pulses which exceed the pre-set threshold.

Baseline Stability In the prior-art embodiment of this detector system, DC base-line stability is achieved by employing capacitive AC coupling through capacitor 15 connected between the output of the shaping post-amplifier 14 and the input to the threshold discriminator 18, plus base-line restoration by means of resistor 16 and diode 17 at the discriminator input terminal. This, however, leads to severe loss of signal amplitude due to saturation effects at high radiation intensities. In this work we describe a new approach that maintains a linear rate-meter response over a wider range of excitations, preserving sensitivity at the very lowest radiation intensities, but with substantially less signal loss due to count-rate saturation at high radiation intensities.

The subjects of noise suppression, pulse shaping, pulse-height discrimination, baseline stability, etc., have been widely studied and reported in the literature. However, the emphasis heretofore has been primarily focused on maintaining individual pulse-to-pulse signal fidelity in connection with gamma ray or X-ray spectroscopy. In the present work we are less concerned with individual pulse signal fidelity since that becomes less relevant at very high radiation intensities, when signal pulses overlap to the extent that they are no longer distinguishable from one another. Instead, our emphasis here is on preserving the mean value of the low-pass filtered time-sequence of pulses (rate-meter response), even when the pulses overlap and 'pile up' many times over.

OBJECTS AND ADVANTAGES OF THE INVENTION

Therefore, it is an object of this invention to enhance detector system dose-rate linearity and dynamic range by reducing saturation effects at high-count-rates, while preserving system sensitivity at low count-rates.

It is a further object of this invention to introduce a new analog threshold discriminator circuit which preserves detector system dose-rate linearity under conditions of extreme count-rate overload.

It is a further object of this invention to introduce a novel application of a signal base-line holder, or stabilizer circuit, which facilitates the implementation of the above-mentioned enhancements.

BRIEF DESCRIPTION OF THE DRAWINGS

FIG. 5 illustrates the reason for loss of 'DC average' information from an AC-coupled amplifier chain.

TABLE 1

Figure 1:
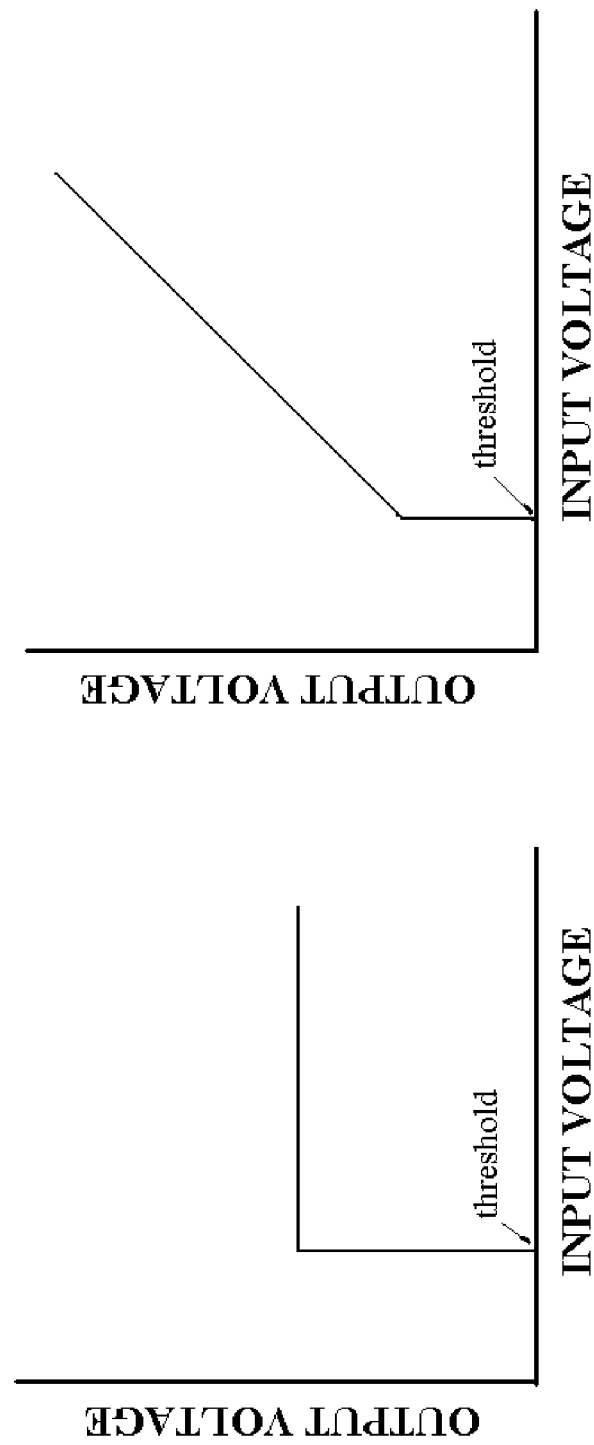
FIG. 1A is a graph showing the input-output voltage characteristic of a threshold discriminator of the prior art.
FIG. 1B is a graph showing the input-output voltage characteristic of a new type of analog threshold discriminator

(reference numerals associated with the various elements and components listed in the FIGURES and discussed in this application.)

| | |
|---|---|
| 1 | signal input to threshold discriminator. |
| 2, 3 | Junction field-effect transistors; preferably a matched pair on a common substrate |
| 4 | Source-bias resistor; 100K ohms |
| 5, 6 | PNP transistors such as 2N3906 |
| 7, 8 | resistors, 10K ohm |
| 9 | resistor, 100K ohm |
| 10 | load resistor for discriminator |
| 11 | output terminal of threshold discriminator |
| 12 | scintillation probe sealed in metallic housing |
| 12A | scintillation probe sealed in metallic housing |
| 13 | wide-bandwidth first amplifying circuit |
| 13A | wide-bandwidth first amplifying circuit |

TABLE 1-continued (reference numerals associated with the various elements and components listed in the FIGURES and discussed in this application.)

| | |
|---|---|
| 13B | base-line holder and feedback control means |
| 14 | constrained bandwidth second amplifying circuit |
| 14A | constrained bandwidth second amplifying circuit |
| 15 | coupling capacitor |
| 16, 17 | diode + resistor base-line restorer circuit components |
| 18 | prior-art threshold discriminator |
| 18A | new analog threshold discriminator |
| 19, 20 | RC integrating filter |
| 19A, 20A | RC integrating filter |
| 21 | pulse-generating signal source |
| 22, 23 | RC filter network |
| 24, 25 | RC filter network |
| 26 | coupling capacitor |
| 27, 28 | diode + resistor baseline restorer |
| 29 | output terminal of pulse generator 21 |
| 29A | representation of pulse waveform at terminal 29 |
| 30 | test-point terminal after 2-section RC filter network |
| 30A | representation of pulse-waveform on terminal 30 |
| 31 | signal test-point terminal at baseline restorer |
| 31A | representation of pulse-waveform at terminal 31 |
| 32 | representing scintillation probe |
| 33 | current source representing probe's DC quiescent current |
| 34 | current source representing probe's signal pulse current |
| 35, 36 | NPN transistors such as 2N3904 |
| 37 | N-channel junction FET such as 2N5484 |
| 38 | NPN transistor such as 2N3904 |
| 39, 40, 41 | PNP transistors such as 2N3906 |
| 42 | P-channel junction FET such as 2N5461 |
| 43 | feedback resistor |
| 44, 46 | NPN transistors |
| 45, 47 | emitter-load resistors |
| 48 | Rectifying diode |
| 49 | resistor with high resistance |
| 50, 51 | integrating filter capacitors |
| 52 | integrating filter resistor with high resistance |
| 53 | CMOS operational amplifier |
| 54 | integrating filter capacitor |
| 55 | feed-back resistor |
| 56 | resistor |
| 57 | base-line holder reference setting |
| 58 | negative power-supply voltage source |
| 59 | positive power-supply voltage source |
| 60 | output trminal |
| 65 | output terminal |
| 65A | output terminal |
| 72 | threshold voltage setting |
| 72A | discriminator threshold terminal |
| 73 | discriminator power supply terminal |
| 74 | baseline common reference |

DETAILED DESCRIPTION OF A NEW EMBODIMENT

In a radiation counter, input pulses whose amplitude exceeds a pre-determined threshold generate corresponding output pulses of fixed amplitude which, in turn, are either counted digitally or time-averaged in an analog rate-meter circuit. Our new solution entails giving up on the notion of 'pulse counting', per se, and replacing the standard threshold discriminator of the prior art with a new circuit combining the functions of a threshold discriminator and a linear transmission gate.

In the prior art, such combination circuits employed dual signal paths; one each for the threshold discriminator and linear transmission gate functions (Leo, 1994; Elad, et al, 1965; Eder, 1984). Here, we present a simpler, more straightforward embodiment of a linear threshold discriminator that utilizes only one signal transmission path.

FIGS. 1A and 1B compare the input-output characteristic of a standard threshold discriminator of the prior art, versus our new, combined-function, analog threshold discriminator circuit. The output of a standard threshold discriminator circuit of the prior art is zero for input pulses whose amplitude is less than the threshold, and steps to a fixed, pre-determined value for input pulses which exceed the threshold. In the new circuit, the output is again zero for input pulses which are less than the threshold, but when the input pulse amplitude exceeds the threshold, the output steps, then linearly follows the amplitude of the input.

The analog time-averaged (analog rate-meter) output signal from this circuit is proportional to the time-average of energy absorbed (i.e., dose-rate) in the detector probe. The new circuit retains the noise-reducing and drift-reducing advantages of a standard threshold discriminator at low count rates, but with the added advantage that information contained in signal pulses which overlap and pile up is preserved over a substantially greater range of input excitations.

Figure 3:
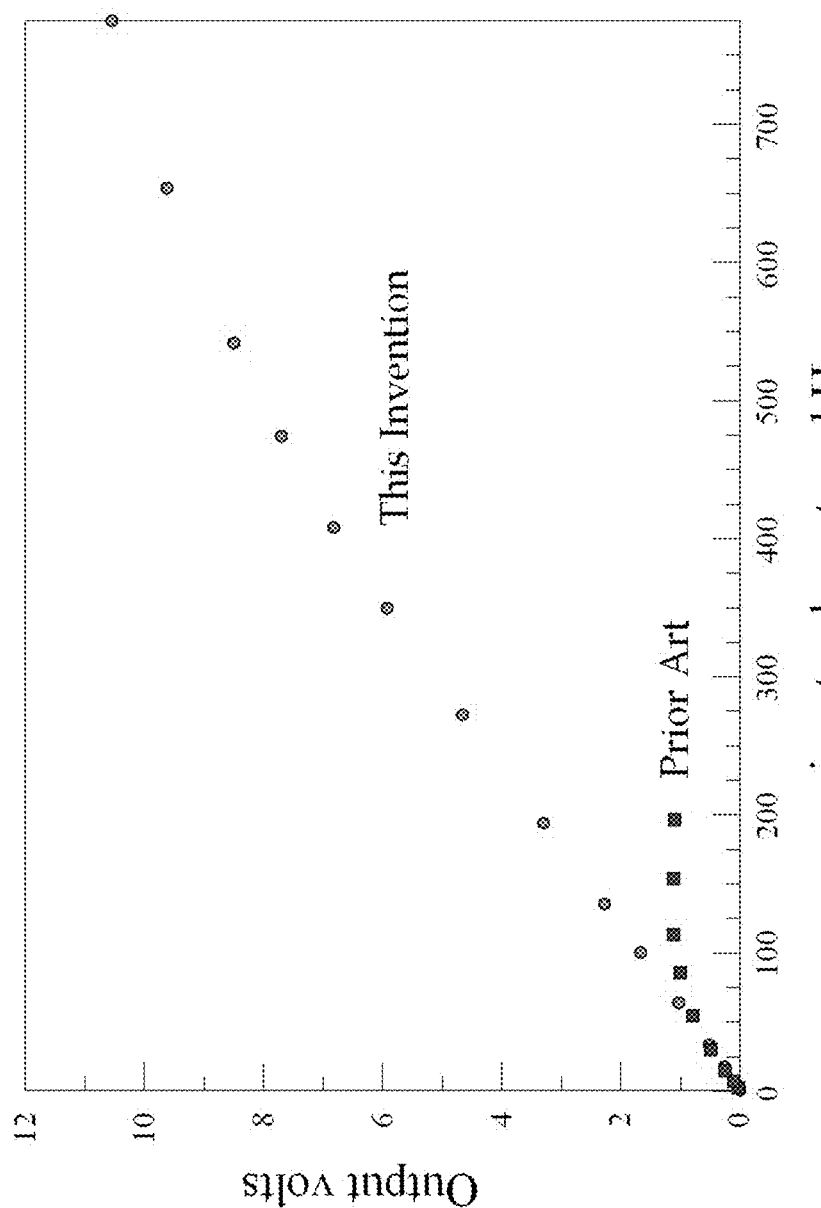
FIG. 3 Is a graph comparing the signal response of an AC-coupled amplifier plus 'time over threshold' discriminator of the prior art with respect to the signal response of a DC-coupled amplifier plus analog threshold discriminator of the present invention.

Experimental Validation Detector systems of the prior art and of this invention were each tested in our lab using an adjustable-rate random pulse generator (White, 1964) driving a light-emitting diode which illuminated a Si PIN photodiode coupled, in turn, to a charge-integrating pre-amplifier. With this apparatus we were able to simulate our radiation detector system's response to the Poisson temporal/statistical characteristic of a source containing radioactive material—but without having to handle and store large sources of radioactivity that would otherwise be required to perform these tests over the full range of count-rate excitation. The data are normalized so that the curves are tangent at low input count rates. As shown in FIG. 3, comparing discriminator outputs versus input count rate excitation, our useful range of input excitations now extends well beyond the point where a standard discriminator of the prior art has 'flat-lined' due to the effects of count-rate saturation.

Dead Time In both embodiments (prior art and new circuit), 'busy time' or 'dead time' for a single pulse is governed by the shaping-amplifier's pulse-width, which is on the order of ~25 micro-seconds at the base which is, as stated previously, a necessary but reasonable compromise between low dead-time and low noise floor. A wider system band-width (shorter shaping time-constant) would allow a narrower signal pulse which, in turn, would yield a higher maximum count rate, but that would come at the cost of a higher noise floor, requiring a correspondingly higher threshold setting, potentially compromising performance for lower-energy photon-emitters.

As shown in FIG. 3, the time-averaged output of an AC-coupled time-over-threshold discriminator of the prior art saturates at ~100 kHz mean input pulse rate, while our new analog threshold discriminator circuit, combined with DC inter-stage coupling, significantly extends the useable range of the detector system. With the new circuit, a slight downward curvature in rate-meter response begins to be noticeable at ~400 kHz input count-rate, but the observed mean value of the analog rate-meter signal output is monotonic—still increasing—up to the present limit of our random-pulse generator test apparatus at ~800 kHz.

Figure 2:
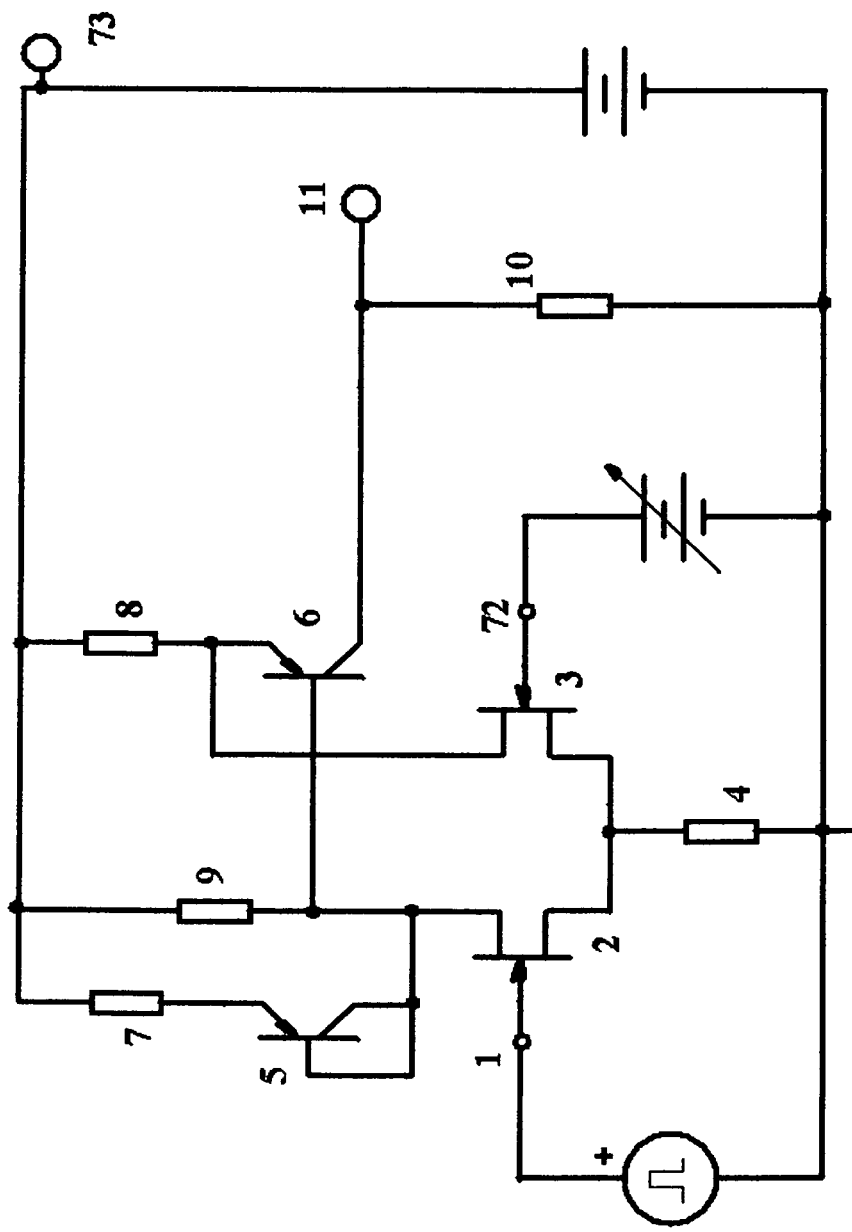
FIG. 2 is a schematic diagram of an embodiment of a new type of analog threshold discriminator.

A simplified schematic of a practical embodiment of the new discriminator circuit is shown in FIG. 2. Our present choice for the active elements 2 and 3 is a matched pair of N-channel junction field-effect transistors (JFET's) of a particular type (LSK389A from Linear Integrated Systems, Inc., Fremont, Calif.) fabricated on a common substrate. The operational characteristics of these JFET's, together with the choice of bipolar junction transistors 5, 6 and the values of resistors 4, 7, 8, 9, and 10, are chosen by design (refer to table 1) to produce the desired transfer characteristic described by the graph in FIG. 1B.

The abscissa values in FIG. 1B represent the signal voltage at analog threshold discriminator input terminal 1, measured with respect to the base-line, shown at zero potential. The ordinate values in FIG. 1B represent the resulting collector-output current from transistor 6 which, in turn, produces a corresponding voltage signal across load resistor 10, as measured at discriminator output terminal 11. The ordinate value is equal to zero when the abscissa value is less than the pre-set threshold measured at terminal 72 in FIG. 2, and the ordinate value becomes equal to the product of the abscissa value multiplied by a pre-determined numerical constant when the abscissa value exceeds the threshold value. The circuit of FIG. 2 is only one example of an analog threshold discriminator; other circuit embodiments that achieve the desired input-output transfer characteristic are also possible.

Figure 4:
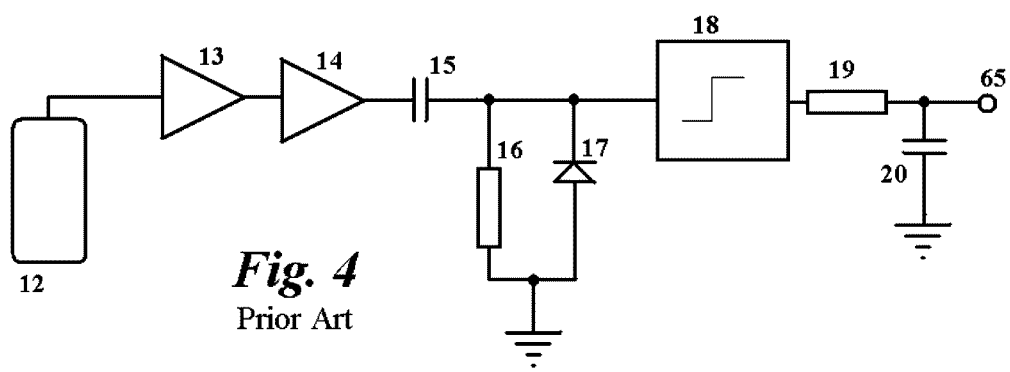
FIG. 4 is a block diagram of the system incorporating an AC-coupled amplifier chain, employing a threshold discriminator of the prior art.

Extending Dynamic Range by eliminating AC inter-stage coupling A simple way (though not necessarily the best way) to achieve detector system DC base-line stability is to employ capacitive AC inter-stage coupling with base-line restoration at the input to the discriminator, as illustrated in FIG. 4. Unfortunately, AC inter-stage coupling, combined with the deliberately-constrained bandwidth of shaping amplifier 14, leads to a loss of DC-average information, ultimately causing a substantial drop in the time-averaged mean of the signal pulse train measured at the highest count rates.

Referring to the illustrative example in FIG. 5, the reason becomes obvious: A high-rate stream of narrow pulses measured at terminal 29, is attenuated (thus shrinking toward the mean value) by the action of RC filter network 22, 23, 24, 25, producing the trace 30A measured at terminal 30.

Since intermediate terminal 30 is DC coupled to the output of signal source 21 through resistors 22 and 24, the time-averaged mean voltage measured at terminal 30 is identical to the time-averaged mean voltage measured at terminal 29. However, coupling capacitor 26 cannot transmit a DC voltage. Higher and higher pulse rates from signal source 21, combined with the low-pass filter action of RC network 22, 23, 24, 25, followed by capacitive AC coupling (capacitor 26), and base-line restoration (diode 27 and resistor 28) inevitably leads to an ever-diminishing time-averaged mean signal amplitude at terminal 31 as compared with the true mean signal amplitude measured at terminal 29.

Figure 4A:
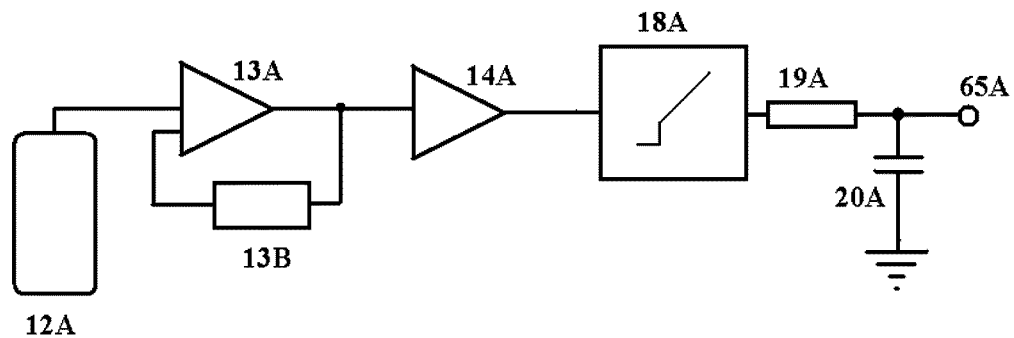
FIG. 4A is a block diagram of the new system incorporating a base-line holder on the wide-bandwidth first amplifying circuit with DC coupling throughout the post-amplifier chain, and employing a new type of analog threshold discriminator.

However, referring to FIG. 4A, we can achieve DC base-line stability and signal mean value integrity by eliminating capacitive coupling, maintaining a fixed base-line at the output of the post-amplifier's wide-bandwidth first amplifying stage 13A, and using DC coupling throughout the following shaping amplifier stages, up to and including the input to the new threshold discriminator 18A.

Figure 6:
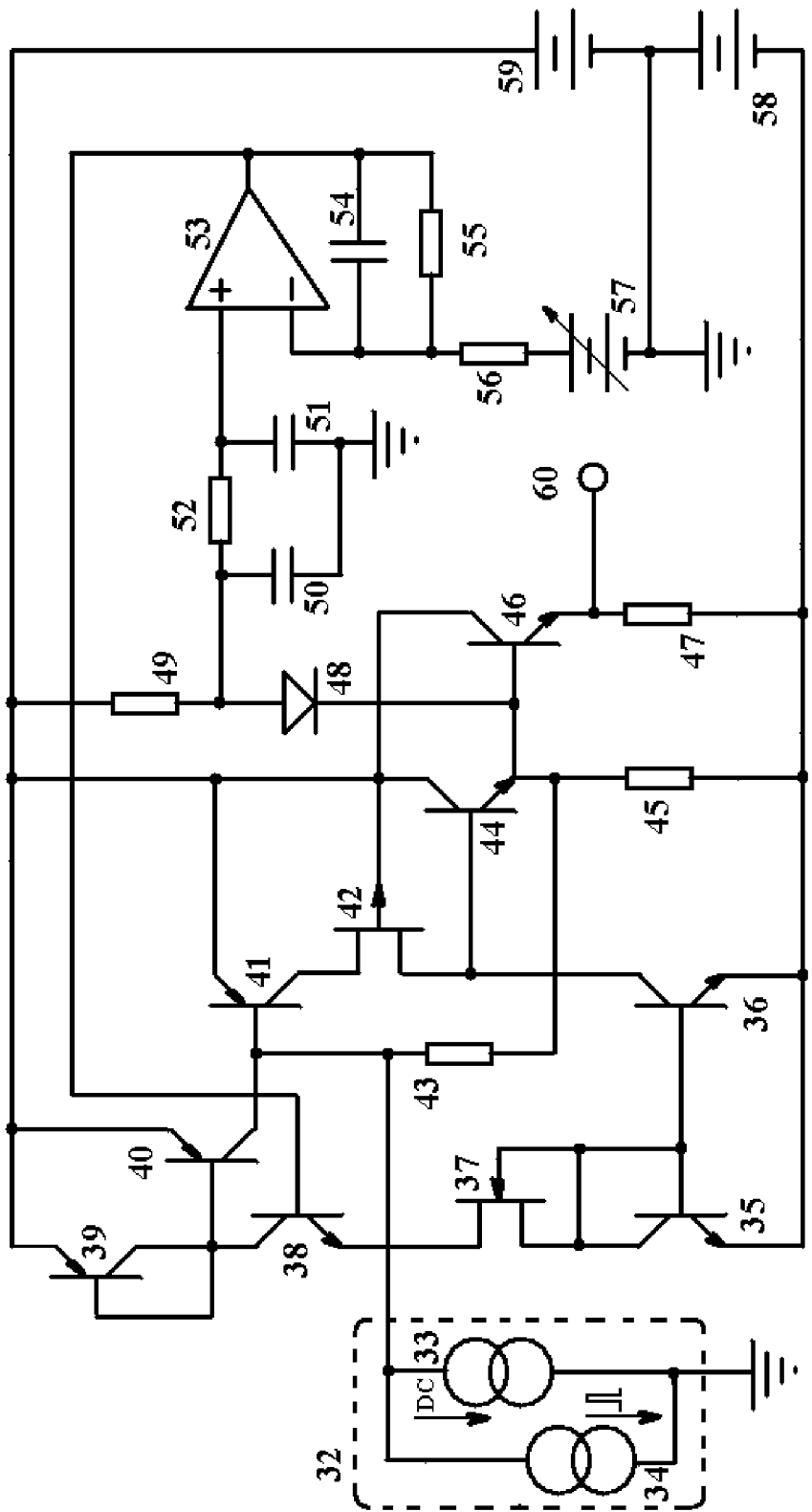
FIG. 6 is a schematic diagram of a practical embodiment of a wide-band first amplifying circuit with base-line holder.

First Amplifying Circuit A schematic of a suitable realization of a wide-bandwidth first amplifying circuit is shown in FIG. 6. Probe 32 is powered (quiescent current 33) and its signal transmitted (signal pulse current 34) through a connection to the input of the post-amplifier via a short length of coaxial cable. FIG. 6 shows an example of an amplifying circuit, known as a Norton current-difference amplifier (National Semiconductor, Inc., 2000) which, in this embodiment, is assembled from discrete components.

This amplifier circuit is one of several possible circuit configurations that can provide the necessary gain and bandwidth performance characteristics, is compatible with a base-line-holder function described below, and is compatible with the afore-mentioned pre-amplifier circuit (Carroll 1999, 2000) currently utilized in probe 32.

PNP bipolar transistors 39 and 40 maintain correct operating bias at the input to the main-amplifying element, PNP bipolar transistor 41 which, together with p-channel JFET 42, forms a cascode amplifying stage with enhanced bandwidth. NPN bipolar transistors 35 and 36 serve as a current mirror active load for gain stage 41 and 42. The amplified pulse-output signal appears at the emitter of NPN bipolar transistor 44. In this embodiment, the nominal width of signal pulses is ~10 micro-seconds at the base-line.

Baseline Holder The emitter of transistor 44 connects back to the input of the first amplifying transistor 41 through feedback resistor 43. The value of resistor 43 determines the overall trans-resistance gain of the first amplifying stage. For example, if resistor 43=500K ohms, then an input signal current pulse of 1 micro-ampere will produce a voltage pulse at the emitter of NPN transistor 44=0.5 volts.

The emitter of transistor 44 also drives a negative-peak rectifying diode 48 which, together with resistor 49 and capacitor 50, function as an input sensor for a baseline holder circuit. Diode 48 should preferably have low reverse leakage current. The resistance of 49 should be relatively high—10 to 20 meg-ohms—so as to limit the forward current through diode 48 to no more than a few micro-amperes. The time constant of RC network resistor 49 plus capacitor 50, and resistor 52 plus capacitor 51, respectively, should be on the order of ~1-2 seconds; for example, resistors 49 and 52=10 megohms, and capacitors 50 and 51=0.1 μF.

Baseline holder control amplifier 53, in combination with feedback resistor 55 and capacitor 54, enhance low-pass filter performance ($F_c$<1 hz) and serves as a buffer/isolation amplifier to drive amplifier base-line control stage NPN transistor 38.

Our scheme uses a simple negative-peak-detecting diode rectifier 48 as the input sensor controlling the baseline holder action. The negative-peak rectifying diode sensor function may, however, be implemented by other means, such as a synchronous rectifier, comparator, or other non-linear element.

In works reported by others (East, 1970; Fiorini, et al, 2005; De Geronimo, et al, 2000; DeGeronimo, 2005; DeCorsi, et al, 2008; Grosholz, et al, 2009) the input sensor for a base-line holder or stabilizer circuit is connected to the output of a constrained bandwidth pulse-shaping amplifier chain in order to hold the signal baseline at that point fixed, thereby enhancing pulse fidelity for signal analysis or pulse-height spectroscopy. In the embodiment of the invention, a base-line holder's input sensor is connected to a point prior to the input of the constrained-bandwidth stage(s), i.e., at the output of a high-gain, wide bandwidth first amplifying circuit.

Weiner (1980) describes a base-line corrector circuit which acts only during the 'quiet time' between signal pulses. In the present invention, the baseline holder is always active, thus maintaining a base-line common reference potential during times when no signals are present, as well as during times of extreme pulse-rate overload.

Control-amplifier 53 provides high loop gain in order to effect tight control of the baseline at the output of the wideband first amplifier circuit. Amplifier 53 preferably has low input offset drift, plus a very low input bias current (such as the LM6XXX series of CMOS operational amplifiers from National Semiconductor, Inc.). For practical reasons, the first baseline voltage at the output of the wide-band first amplifier circuit may not necessarily be identical to the second baseline voltage at the output of the following, constrained-bandwidth amplifier circuit; there may be a pre-determined offset established by design. Adjustable reference voltage 57 is used to pre-set the second baseline to a convenient potential when no radiation-induced signal pulses are present. In the embodiment shown in FIG. 6, a small power-supply, zener diode, or equivalent voltage regulating element 58 (~2.5 volts DC) is used to shift the operating point of the wide-bandwidth first amplifying circuit to facilitate setting this second base-line to zero, or ground potential.

N-channel JFET 37 is configured as a current-limiting element to protect against input over-drive, but JFET 37 normally behaves as a low-value resistor (<1K ohm) when the current through 37 is less than its saturation value (Idss).

The post-amplifier's wide-bandwidth first amplifying circuit is followed by a multi-pole DC-coupled active-filter/shaping amplifier stage (or stages) to provide a desired Gaussian pulse shape and to suppress wide-band noise. Most of the gain in the post-amplifier should be concentrated in the wide-bandwidth first amplifying circuit so that the signal amplitude at the output of that first amplifying circuit is sufficient to effect a robust base-line-holder function, as described above. The signal pulses at the output of the wide-bandwidth first amplifier circuit, as well as the output of the constrained-bandwidth second amplifier circuit, should preferably be unipolar with appropriate pole-zero cancellation to minimize long tails on the pulse's trailing edge, while simultaneously minimizing undershoot relative to the base-line. Details regarding implementation of these circuit characteristics will be familiar to those schooled in the art, and are not discussed here.

Figure 7:
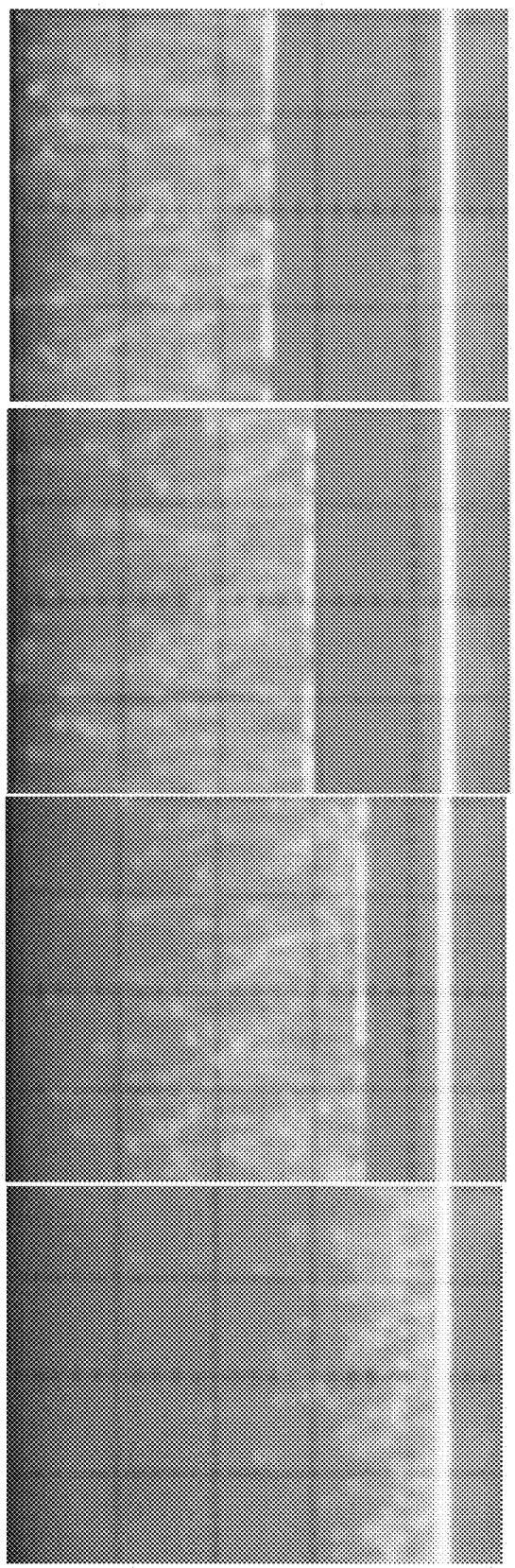
FIG. 7 is a series of oscilloscope traces showing that the signal baseline at the input to the analog threshold discriminator rises or 'levitates' at extreme count-rates.

'Levitating Base-line' As described above, the signal baseline at the input to the constrained-bandwidth second amplifying circuit is held fixed by a base-line holder acting on the preceding wide-band first amplifying circuit. However, as suggested by the example in FIG. 5, the signal base-line at the output of the constrained-bandwidth second amplifying circuit may appear to rise, or 'levitate', at very high input count-rates, as shown in FIG. 7.

As the signal pulse rate is increased to the extreme, the signal's base-line may even exceed the discriminator's threshold setting. When that happens, the threshold is no longer operative, and the analog threshold discriminator functions as a simple linear-transmission circuit element. At this extreme signal level, noise suppression is no longer an issue, but the time-averaged, or mean value of the low-pass-filtered signal pulse-train (rate-meter signal output) is mostly preserved—even when the pulse rate is so high that most signal pulses overlap one another and 'pile up' many times over.

SUMMARY, RAMIFICATIONS, AND SCOPE OF THE INVENTION

The signal from a semiconductor diode scintillation probe operating at room temperature is a time-random train of relatively narrow pulses superimposed upon an inherent noise floor and a quiescent base-line operating current or voltage. The scintillation probe is followed by a post-amplifier comprising a relatively wide-bandwidth first amplifying circuit which, in turn, is DC-coupled to the input of a second amplifying circuit whose bandwidth is constrained in order to enhance signal-to-noise ratio.

The wide-bandwidth first amplifying circuit employs a base-line holder circuit to lock its output signal base-line voltage to a fixed reference. As the scintillation probe is exposed to ever more intense radiation fields, the corresponding time-random signal pulse-rate increases to such an extreme that signal pulses at the output of the constrained-bandwidth second amplifying circuit will overlap and 'pile up' many times over, so that the output signal is no longer discernable as a train of discrete pulses, but rather begins to resemble a random noise waveform. In principal—assuming the amplifier itself does not saturate—the mean value of the signal waveform at the output of the constrained-bandwidth amplifier, relative to the base-line, is preserved. However, capacitive inter-stage coupling cannot be used for connection to a subsequent discriminator circuit, since a capacitor cannot transmit a DC signal. All circuitry after the wide-band first amplifying circuit must be DC coupled.

Thus, a semiconductor diode scintillation detector probe, in conjunction with a base-line-stabilized, wide-bandwidth first amplifying circuit DC-coupled to a constrained-bandwidth second amplifying circuit DC-coupled, in turn, to a novel analog threshold discriminator circuit, suppresses baseline fluctuation and noise at low input count-rates, while providing a linear rate-meter response for time-random input pulse rates far in excess of what would otherwise—as in the prior art—be 100% saturation.

While the above description teaches a particular specification, this should not be construed as a limitation on the scope of the invention, but rather as one example of a practical embodiment. Many variations are possible, depending on available components, technology, and resources. Accordingly, the scope of the invention should be determined not by the embodiment illustrated, but by the appended claims and their legal equivalents.

I claim:

1. An apparatus for extending a scintillation detector's dynamic range, said scintillation detector comprising a detector-transducer and associated preamplifier, in combination with the apparatus of the invention;
   said apparatus comprising a two-section post-amplifier and a linear analog threshold discriminator circuit;
   said two-section post-amplifier comprising a high-gain, wide-bandwidth, first amplifying circuit DC-coupled to an input of a low-gain, constrained bandwidth, second amplifying circuit;
   the signal outputs of said first and second amplifying circuits having, respectively, a first baseline voltage and a second baseline voltage;
   said first amplifying circuit having a baseline sensor and feedback means to measure and to stabilize said first baseline voltage in the absence and in the presence of radiation-induced signal pulses over a wide range of pulse rates up to, and including, extreme signal pulse-rate overload;
   a pre-determined DC offset voltage being added to said first baseline voltage to establish a desired baseline common reference potential at the input to said second amplifying circuit;
   the amplified signal pulses at the input to said second amplifying circuit being unipolar with respect to said baseline common reference potential, said amplified signal pulses being superimposed upon unwanted, but concurrently-amplified, electronic noise, said signal pulses having a time-averaged mean voltage relative to said baseline common reference potential, said time averaged mean voltage being proportional to a dose-rate from radiation incident on said detector-transducer;
   the bandwidth of said second amplifying circuit being constrained so as to attenuate said unwanted electronic noise relative to said signal pulses;
   the output of said low-gain constrained-bandwidth second amplifying circuit being DC-coupled to an input of a linear analog threshold discriminator circuit;
   the input-output transfer characteristic of said linear analog threshold discriminator circuit being described by a plot-line on a graph, the abscissa and ordinate values on said graph representing, respectively, the voltage at the input of said analog threshold discriminator measured with respect to said baseline common reference potential, and the corresponding output current of said discriminator circuit;
   said ordinate value being equal to zero when the abscissa value is less than a pre-set threshold, said threshold setting being expressed with respect to said baseline common reference potential, said threshold being pre-set to a value greater than the peak amplitude of unwanted noise at the output of said second amplifying circuit;
   said ordinate value being equal to the product of the abscissa value multiplied by a pre-determined numerical constant when said abscissa value exceeds the pre-set threshold, said analog threshold discriminator circuit thereby blocking unwanted noise while transmitting wanted signal pulses, maintaining a linear dose-rate response when the signal pulse count rate is low;
   said low-gain, constrained bandwidth second amplifying circuit having a signal waveform at its input and at its output, said input signal waveform being unipolar relative to said baseline common reference potential, said output signal waveform being unipolar with respect to said second baseline;
said second baseline voltage being equal to said baseline common reference potential when the signal pulse count-rate is low;
   when said scintillation detector is exposed to increasing intensity of incident radiation, said input signal waveform and said output signal waveform displaying a progressively and correspondingly more dense superposition of time-random signal pulses;
   said DC coupling in combination with constrained bandwidth of said second amplifying circuit causing said output signal waveform to shrink toward its mean value, thereby causing said second baseline voltage to rise relative to said baseline common reference potential as the signal pulse count-rate is increased, until said second baseline exceeds said discriminator threshold setting, in consequence thereof said output signal waveform being transmitted directly through said linear threshold discriminator, thus yielding an output signal current from said linear threshold discriminator whose time-averaged mean value remains linearly proportional to dose-rate under conditions of extreme count-rate overload.

2. An apparatus for extending a scintillation detector's dynamic range;
   said scintillation detector comprising a detector-transducer and associated preamplifier, in combination with the apparatus of the invention;
   said apparatus comprising a two-section post-amplifier and a linear analog threshold discriminator circuit;
   said two-section post-amplifier comprising a high-gain, wide-bandwidth, first amplifying circuit DC-coupled to an input of a low-gain, constrained bandwidth, second amplifying circuit;
   the signal outputs of said first and second amplifying circuits having, respectively, a first baseline voltage and a second baseline voltage;
   said first amplifying circuit having a baseline sensor and feedback means to measure and to stabilize said first baseline voltage in the absence and in the presence of radiation-induced signal pulses over a wide range of pulse rates up to, and including, extreme signal pulse-rate overload;

a pre-determined DC offset voltage being added to said first baseline voltage to establish a desired baseline common reference potential at the input to said second amplifying circuit;

the amplified signal pulses at the input to said second amplifying circuit being unipolar with respect to said baseline common reference potential, said amplified signal pulses being superimposed upon unwanted, but concurrently-amplified, electronic noise, said signal pulses having a time-averaged mean voltage relative to said baseline common reference potential, said mean voltage being proportional to a dose-rate from radiation incident on said detector-transducer;

the bandwidth of said second amplifying circuit being constrained so as to attenuate said unwanted electronic noise relative to said signal pulses;

the output of said low-gain constrained-bandwidth second amplifying circuit being DC-coupled to an input of a linear analog threshold discriminator circuit; said discriminator circuit employing a single signal path;

said linear analog threshold discriminator circuit incorporating a first N-channel junction field effect transistor and a second N-channel junction field effect transistor; said field effect transistors each having respective gate, drain, and source terminals;

said linear analog threshold discriminator circuit also incorporating a first PNP bipolar transistor and a second PNP bipolar transistor, said transistors each having respective emitter, base, and collector terminals;

said linear analog threshold discriminator circuit having a signal input terminal, a threshold-voltage setting means, a power-supply terminal, a signal output terminal, and a baseline common reference terminal;

the source terminal of the first junction field effect transistor being connected to the source terminal of the second field effect transistor, and also connected through a first resistor to said baseline common reference potential;

the gate of said first field effect transistor being designated the signal input terminal, the gate of said second field effect transistor being connected to said threshold-voltage setting means;

the drain of said first field effect transistor being connected to the base and collector of said first PNP bipolar transistor, being also connected to the base of said second PNP bipolar transistor, and also connected through a second resistor to said power supply terminal;

the emitter of said first PNP bipolar transistor being connected through a third resistor to said power supply terminal;

the drain of said second field effect transistor being connected to the emitter of said second PNP bipolar transistor and also connected through a fourth resistor to said power supply terminal;

the collector of said second PNP bipolar transistor being connected through a fifth resistor to said baseline common reference potential, and also connected to said output terminal;

the respective resistance values of each of said resistors, and the device characteristics of said field effect transistors being chosen by design to produce a specified input-output signal transfer characteristic;

the input-output transfer characteristic of said linear analog threshold discriminator circuit being described by a plot-line on a graph, the abscissa and ordinate values on said graph representing, respectively, the voltage at the input of said analog threshold discriminator measured relative to said baseline common reference potential, and the corresponding output current of said discriminator circuit;

said ordinate value being equal to zero when the abscissa value is less than a pre-set threshold, said threshold setting being expressed relative to said baseline common reference potential, said threshold being pre-set to a value greater than the peak amplitude of unwanted noise at the output of said second amplifying circuit;

said ordinate value being equal to the product of the abscissa value multiplied by a pre-determined numerical constant when said abscissa value exceeds the pre-set threshold, said analog threshold discriminator circuit thereby blocking unwanted noise while transmitting wanted signals, maintaining a linear dose-rate response when the signal pulse count rate is low;

said low-gain, constrained bandwidth second amplifying circuit having a signal waveform at its input and at its output, said input signal waveform being unipolar relative to said baseline common reference potential, said output signal waveform being unipolar with respect to said second baseline;

said second baseline voltage being equal to said baseline common reference potential when the signal pulse count-rate is low;

said DC coupling in combination with constrained bandwidth of said second amplifying circuit causing said output signal waveform to shrink toward its mean value, thereby causing said second baseline voltage to rise relative to said baseline common reference potential as the signal pulse count-rate is increased, until said second baseline exceeds said discriminator threshold setting, in consequence thereof said output signal waveform being transmitted directly through said linear threshold discriminator, thus yielding an output signal current from said linear threshold discriminator whose time-averaged mean value remains linearly proportional to dose-rate under conditions of extreme count-rate overload.

3. The apparatus of claim 1 wherein said high-gain, wide-bandwidth first amplifying circuit is a Norton current-difference circuit.

4. The apparatus of claim 2 wherein said high-gain, wide-bandwidth first amplifying circuit is a Norton current-difference circuit.

5. The apparatus of claim 1 wherein said detector preamplifier is connected to the input of said post-amplifier through a single coaxial cable carrying power to, and signal from, said preamplifier.

6. The apparatus of claim 2 wherein said detector preamplifier is connected to the input of said post-amplifier through a single coaxial cable carrying power to, and signal from, said preamplifier.

7. The apparatus of claim 1 wherein said linear analog threshold discriminator employs a single signal path.

8. The apparatus of claim 1 wherein said linear analog threshold discriminator employs a dual signal path comprising a threshold discriminator in combination with a linear analog transmission gate.

* * * * *